W. E. COPITHORN.
WHEEL.
APPLICATION FILED JAN. 11, 1915.
1,166,817.
Patented Jan. 4, 1916.
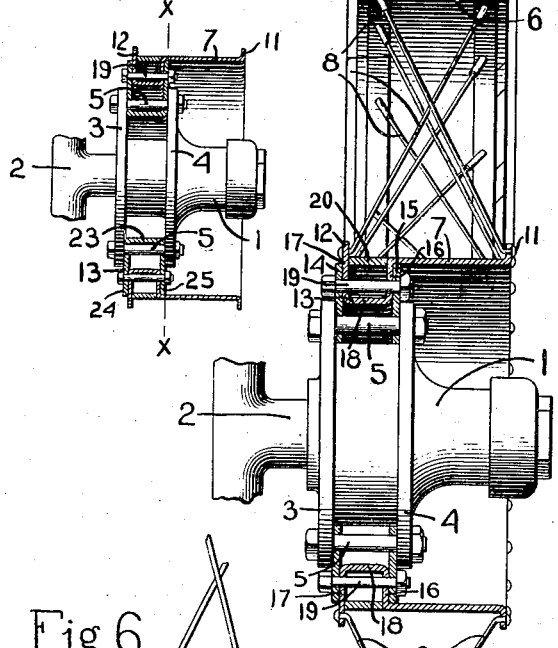
Fig. 1.
Fig. 2.
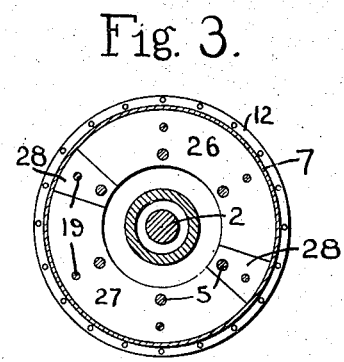
Fig. 3.
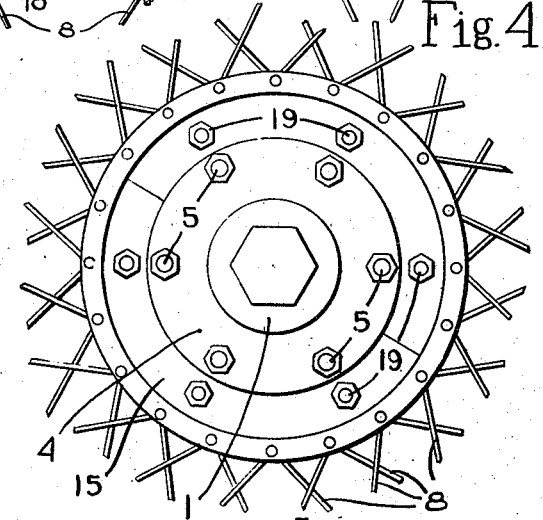
Fig. 5.
Fig. 4.
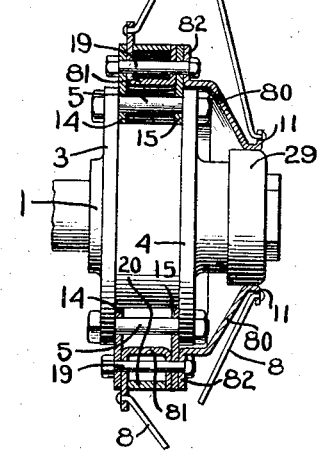
Fig. 6.
Witnesses.
J. Morrill Fuller
William E. Gagen
Inventor.
Walter E. Copithorn
by Heard Smith & Tennant.
Att'ys

UNITED STATES PATENT OFFICE.

WALTER E. COPITHORN, OF NATICK, MASSACHUSETTS.

WHEEL.

1,166,817.  Specification of Letters Patent.  Patented Jan. 4, 1916.

Application filed January 11, 1915. Serial No. 1,512.

*To all whom it may concern:*

Be it known that I, WALTER E. COPITHORN, a citizen of the United States, residing at Natick, county of Middlesex, State of Massachusetts, have invented an Improvement in Wheels, of which the following description, in connection with the accompanying drawing, is a specification, like characters on the drawing representing like parts.

This invention relates to wheels and especially to automobile wheels and has for its object to provide a novel construction by which a wheel body having a demountable rim or quick-detachable tire can be applied to the hub of an ordinary wheel by simply removing the spokes of the ordinary wheel from the hub and substituting therefor a construction embodying my invention. There are many automobiles now in use that are made with wooden spokes and are equipped with an ordinary clencher rim. It is, however, of great advantage to have an automobile wheel equipped with either a demountable rim or a quick-detachable tire construction so as to permit of readily changing tires when they become defective.

My invention comprehends a wheel body having a demountable rim or quick-detachable tire construction, which wheel body is constructed so that it can be applied to the hubs of any automobile, thus making it possible to convert any automobile wheel into one having a demountable rim.

In order to give an understanding of my invention I have illustrated in the drawings some selected embodiments thereof which will now be described, after which the novel features will be pointed out in the appended claims.

Figure 1 is a sectional view through a portion of an automobile wheel embodying my invention; Fig. 2 shows a modification of the invention shown in Fig. 1; Fig. 3 is a section on the line *x—x*, Fig. 2; Fig. 4 is a side view of Fig. 1; Figs. 5 and 6 show modifications of the invention.

I have shown at 1 the hub of an automobile wheel of any suitable or usual construction which is rotatably mounted on the axle portion 2 that is herein shown as part of the front steering knuckle. This hub 1 is of the construction commonly used in automobile wheels with wooden spokes, that is, it is provided with the two flanges 3 and 4 between which the inner ends of the spokes are received, said flanges being connected by bolts 5 which are generally situated between the inner ends of the spokes. My improved wheel body is adapted to be attached to a hub of this nature. The wheel body comprises a rim portion 6 and a hub portion 7 that are connected by suitable spokes herein shown as wire spokes 8, although the character of the spokes may be varied without departing from the invention. The rim portion 6 of the wheel body is herein illustrated as sustaining a demountable tire-receiving rim 9 carrying a tire 10 of usual construction, said demountable rim being held in place by a locking ring 100 of any suitable or usual construction. The hub portion 7 is constructed to be detachably applied to the hub 1 of the wheel and to be clamped in place to the flanges 3 and 4 by the bolts 5 that are used in the ordinary wheel for clamping the spokes in position. There are various ways in which this end can be accomplished. In Figs. 1 and 4 the hub portion 7 is formed at each edge with an upturned flange to which the spokes 8 are secured, said flanges being shown at 11 and 12, respectively. This hub portion is also formed with a rib portion 13 to which is clamped or bolted two rings 14 and 15, the latter being received between the flanges 2 and 3 and being bolted thereto by the bolts 5. The hub portion 7 may be made of sheet metal pressed to shape and may be a casting or may be made in any appropriate way. The rib portion 13 is herein shown as comprising the two side walls 16 and 17 connected by the portion 18, and the outer periphery of the side walls 17 constitutes the flange 12 to which the spokes 8 are secured. The two rings 14 and 15 overlie the rib portion 13 and are secured thereto by means of bolts 19. These rings or annular plates form in effect detachable extensions of the rib that enter between the flanges 3 and 4. The rib member 13 is of such a shape that the interior diameter thereof is slightly greater than the exterior diameter of the flange 4 to permit assembling of the parts. The annular rings 14 and 15 are made in sections, as shown in Fig. 4, each ring preferably being made in two sections. This device can be assembled by first removing the bolts 5 from the hub 1, then placing the two sections of the ring 15 in position against the flange 4, and then slipping the hub portion 7 over the ring 15 until said ring engages the rib 13, and then introducing the two parts of the ring 14 into position, after which the bolts 5 and 19 can be inserted and tightened. The rib 13 is made of such a width that when the rings 14 and 15 are clamped thereto said rings will just fit between the flanges 3 and 4, and when the bolts 5 and 19 are tightened up my improved wheel will be rigidly and firmly secured in position. I have shown in Fig. 1 a filling ring 20 situated between the side walls 16 and 17 of the rib 13, which filling ring holds said walls properly spaced and keeps them in their proper position.

In Figs. 2 and 3 I have shown a different embodiment of my invention wherein the rings between which the rib 13 of the hub portion 7 is received are constituted by the side walls of a member U-shape in cross section. This member is shown at 23 and the side walls between which the rib 13 is received are designated 24 and 25. This member may be formed into shape from sheet metal or may be cast as desired. The member 23 is made in sections shown at 26 and 27 in Fig. 3, and these sections are spaced from each other by spacing blocks 28. In this embodiment of the invention the two sections 26 and 27 are set into the space between the flanges 3 and 4 of the hub and are moved into a position toward the center of the hub which will permit the rib 13 to be inserted over said members. The hub 7 can then be placed in position and the two sections 26 and 27 moved outwardly so that their side walls 24 and 25 will embrace the rib 13, as shown in Fig. 2. Thereafter the bolts 5 and 19 can be inserted and the filling blocks 28 placed between the sections 26 and 27, thus holding the sections rigidly in position. These filling blocks 28 will preferably be so situated that each will have a bolt 5 and a bolt 19 extending therethrough, thus locking them in position.

In Fig. 5 I have shown an embodiment of the invention wherein the hub portion 70 is contracted at its outer end at which the flange 11 is located so that it will fit closely about the end 29 of the hub 1. This hub member 70 is shaped to present the portion 71 which overlies the outside of the flange 4 and the laterally-extending portion 72 which terminates in the outwardly-directed flange 12 to which the spokes 8 are secured. This flange 12 has an anchoring ring 73 bolted thereto by bolts 74 and this ring enters into the space between the flanges 3 and 4 of the hub 1 and fits against the inner face of the flange 3. The bolts 50 are extended through the flanges 3 and 4, through the ring 73 and through the portion 71 of the hub, thus tying the parts firmly together, and these bolts will preferably have locking nuts 75 thereon so as to make the structure more solid and secure.

In Fig. 6 a still different embodiment of the invention is shown wherein the hub portion is made in two sections, the outer section 80 and the inner section 81. The outer section 80 is shaped at its outer end to present the flange 11 to which the spokes 8 are secured, and it also has a tapered shape so that the outer edge thereof will fit the outer end of the wheel hub. This portion 80 of the hub is provided with the radially-extending flange 82 which overlies the anchoring ring 15. The portion 81 of the hub is an annular member having a general channel shape which is fitted between the anchoring rings 14 and 15 and is secured thereto by means of bolts 19, these bolts also passing through the flange 82 of the hub section 81. The rings 14 and 15 are secured to the flanges 3 and 4 of the hub by the bolts 5, all as illustrated with reference to Fig. 1. The rings 14 and 15 are made in one or more sections so that they can be readily placed in position. Each one of the constructions illustrated can be readily applied to the hub of an ordinary automobile wheel and clamped to the flanges 3 and 4 thereof so that a wheel embodying any one of these constructions can be readily substituted for the wheel body of an ordinary automobile wheel by simply removing the spokes and rim from the hub and then applying my improved wheel body to the hub. This makes it feasible to convert an ordinary automobile wheel into one with a demountable or some other improved form of rim at a minimum expense and without discarding the hub of the wheel. Moreover, it makes it possible to provide a standard form of wheel body capable of being applied to the hubs of a great variety of different kinds and makes of automobiles so that if the owner of any particular automobile desires to have on his machine wheels of the construction herein illustrated this can be done without discarding the hubs from the wheels and by merely applying my improved wheel body to the hubs of the wheels on his automobile.

In some automobile wheels the flange 4 is a removable flange and where this is the case the device shown in Fig. 1 can be applied to the hub by removing the flange 4 and then connecting the rings 14 and 15 to the rib 13, placing the wheel in position and finally replacing the flange 4 and clamping it in place by the bolts 5.

I claim:

1. In a wheel, the combination with a wheel hub having rigid therewith two separated flanges, of a wheel body detachably secured to both of said flanges.

2. In a wheel, the combination with a wheel hub having two separated flanges, of a wheel body provided with a hub portion, presenting an interior rib and a laterally-projecting flange and means to detachably secure said rib to both of said flanges.

3. In a wheel, the combination with a wheel hub having two separated flanges, of a wheel body presenting a hub portion provided with an interior rib encircling the space between said flanges, and means to detachably connect said rib to both of said flanges.

4. In a wheel, the combination with a wheel hub having two separated flanges, of a wheel body presenting a hub portion provided with an interior rib, connecting rings secured to the flanges of the hub and to said rib and securing the wheel body to the hub.

5. In a wheel, the combination with a wheel hub having two separated flanges of two annular plates overlying and secured to said flanges, a wheel body provided with a portion received between said plates, and means for clamping said portion to said plates.

In testimony whereof, I have signed my name to this specification, in the presence of two subscribing witnesses.

Dr. WALTER E. COPITHORN.

Witnesses:
   Louis C. Smith,
   Thomas J. Drummond.